United States Patent [19]

Tominaga et al.

[11] Patent Number: 5,389,417
[45] Date of Patent: Feb. 14, 1995

[54] OPTICAL RECORDING MEDIUM

[75] Inventors: Junji Tominaga; Susumu Haratani; Tokuhiko Handa; Hiroyuki Arioka, all of Nagano, Japan

[73] Assignee: ADK Corporation, Tokyo, Japan

[21] Appl. No.: 91,435

[22] Filed: Jul. 15, 1993

[30] Foreign Application Priority Data

Aug. 28, 1992 [JP] Japan .................................. 4-253832

[51] Int. Cl.$^6$ .............................................. B32B 3/00
[52] U.S. Cl. ........................................ 428/64; 428/65; 428/457; 428/913; 430/945; 346/135.1; 347/264
[58] Field of Search ................... 428/64, 65, 457, 913; 430/945; 346/76 C, 135.1

[56] References Cited

U.S. PATENT DOCUMENTS

| | | | |
|---|---|---|---|
| 5,100,700 | 3/1992 | Ide et al. | 428/64 |
| 5,208,088 | 5/1993 | Tominaja | 428/64 |

FOREIGN PATENT DOCUMENTS 61-130089A 6/1986 Japan .
2-235789A 9/1990 Japan .

*Primary Examiner*—Patrick J. Ryan
*Assistant Examiner*—Elizabeth Evans
*Attorney, Agent, or Firm*—Watson, Cole, Grindle & Watson

[57] ABSTRACT

An optical recording medium includes a recording layer which contains as major components an element (A) selected from Ag, Au, Cu and Pt, an element (B) selected from Ti, Zr, Hf, V, Nb, Ta, Mn, W and Mo, and an element (C) selected from Te, Se and S. The medium features high performance and versatile use.

9 Claims, 7 Drawing Sheets

THE HOMO OF THE CLUSTER Ag2V2Te2

FIG. 4

THE LUMO OF THE CLUSTER $Ag_2V_2Te_2$

F I G. 5

THE HOMO OF THE CLUSTER Ag2Ti2Te2

FIG. 6

THE LUMO OF THE CLUSTER Ag2Ti2Te2

FIG. 7

OPTICAL RECORDING MEDIUM

CROSS-REFERENCE TO THE RELATED APPLICATION

This application is related to the copending U.S. Ser. No. 795,443 titled "Optical Recording Medium", filed Nov. 21, 1991, by Tominaga, Arioka, and Ogawa and assigned to the same assignee as the present invention.

This invention relates to optical recording media.

BACKGROUND OF THE INVENTION

Optical recording disks and other optical recording media have attracted great attention as high capacity information recording media. The optical recording media include rewritable media such as phase change type optical recording media and magneto-optical recording media and write-once media such as pit-constituting type optical recording media.

Among others, the phase change type optical recording media use recording film of a phase changeable alloy which changes its optical reflectance between crystalline and amorphous states or between two different crystalline states. For the phase change type optical recording media with different crystalline states, Ag—Zn alloy is a typical phase changeable alloy as described in Japanese Patent Application Kokai (JP-A) No. 130089/1986. This phase change type optical recording medium having Ag—Zn alloy as the recording film, however, shows a relatively small change in reflectivity due to the phase change. The compact disks (CD) and mini-disks (MD) which have been or will be used in practice rely on the reflectivity change mode in that information carrying areas have lower reflectivity than information-free areas. Since the Ag—Zn alloy when used as recording film provides another reflectivity change mode that light exposed areas, that is, recorded areas have increased reflectivity, it is difficult for media having a Ag—Zn alloy recording film to share a drive unit with the CDs and MDs.

For this and other reasons, JP-A 235789/1990 proposes a new optical recording disk satisfying the CD standard. Disclosed is an optical information recording disk having a high reflectivity layer and a low reflectivity layer stacked on an upper surface of a substrate in this order. The high reflectivity layer is formed of an element selected from the group consisting of Au, Al, Ag, Pt, Pd, Ni, Cr, and Co, or an alloy containing such an element or elements, which has high reflectivity of more than 70% with respect to incident laser light so that it cannot be a recording material as such. The low reflectivity layer is formed of a material which has high absorption to incident laser light over the wavelength range of 750 to 850 nm, for example, chalcogen elements such as Te. Information is recorded in this optical information recording disk by directing recording light to the disk from the substrate upper surface side, that is, the low reflectivity layer side, whereby the chalcogen element of the low reflectivity layer reacts with the element or elements of the high reflectivity layer to form a new alloy. In this way, the light exposed areas have reduced optical reflectivity. Such a change in optical reflectivity can be detected by directing reproducing light to the disk from the opposite side, that is, the substrate lower surface side. This configuration is described as providing write-once compact disks.

According to JP-A 235789/1990, the high and low reflectivity layers are formed by sputtering. We prepared optical recording disks of the disclosed configuration using a sputtering process and carried out recording and reproduction on the disks, finding that unrecorded areas had a reflectivity as low as about 14 to 16% and recorded areas had the reflectivity decreased to only about 10%. As a result, these disks could not be reproduced not only in the standard CD mode, but also by means of a driving equipment adapted for phase change type optical recording disks. This was because in forming a low reflectivity layer of Te on a high reflectivity layer of Ag by sputtering, interdiffusion occurred between the layers to form an alloy or compound between Ag and Te, suggesting that a recorded state was already established during sputtering. As a result, the magnitude of reflectivity and its change are small. It is to be noted that these results were obtained when the high reflectivity layer was formed to a thickness of about 500 Å enough to carry out recording at a linear velocity of 1.2 to 1.4 m/s corresponding to the CD standard.

By increasing the thickness of the high reflectivity layer to about 1,000 Å, the influence of interdiffusion during formation of the low reflectivity layer was reduced so that sufficient reflection is provided by the high reflectivity layer in unrecorded state. However, in this case, it took a long time for the layers to diffuse into each other and recording could not be completed by irradiating recording laser light at the linear velocity prescribed by the CD standard.

In Example 5 of JP-A 235789/1990, a Sb layer and a Te layer are stacked on a high reflectivity layer of Au in this order as low reflectivity layers. A recorded state can be already established at the time of forming the Sb layer since interdiffusion readily takes place between Sb and Au.

A further problem arises with this optical information recording disk in which recording and reproducing light beams are directed to the disk from the substrate front and rear surface sides, respectively. This mode of recording requires that the disk be turned over and reversely rotated with the tracking polarity reversed. Thus a special drive is necessary for recording. Recording light is directed to the disk from the low reflectivity layer side because the high reflectivity layer has a high melting point and low absorption of incident light so that extremely high recording power is necessary if recording light is directed from the substrate side.

SUMMARY OF THE INVENTION

Therefore, an object of the present invention is to provide a novel and improved optical recording medium featuring high performance and versatile operation.

According to the present invention, this and other objects are attained by an optical recording medium comprising a recording layer on a surface of a substrate. The recording layer predominantly contains at least one element (A) selected from the group consisting of Ag, Au, Cu and Pt, at least one element (B) selected from the group consisting of Ti, Zr, Hf, V, Nb, Ta, Mn, W and Mo, and at least one element (C) selected from the group consisting of Te, Se and S.

In one preferred form, the recording layer is of a single layer structure. The medium includes a lower dielectric layer, the recording layer, an upper dielectric layer, and a reflective layer on the substrate in the described order.

In another preferred form, the recording layer is of a three layer structure. The recording layer includes a reflective thin film containing element (A) as a major component, an intermediate thin film containing element (B) as a major component, and a low-melting thin film containing, element (C) as a major component on the substrate in the described order. Preferably, the reflective thin film is 200 to 700 Å thick, the intermediate thin film is 10 to 200 Å thick, and the low-melting thin film is 200 to 1,500 Å thick. The ratio of the thickness of the low-melting thin film to the thickness of the reflective thin film is from 1/1 to 5/1.

In a further preferred form, elements (A), (B) and (C) form a cluster of atoms which has a highest occupied molecular orbital (HOMO) where electrons in element (A) and electrons in element (C) do not form a hybrid orbital and a lowest unoccupied molecular orbital (LUMO) where electrons in element (A) and electrons in element (C) form a hybrid orbital. The cluster has an energy difference of about 0.002 to 3 eV between the HOMO and the LUMO. The cluster is desirably $Ag_2V_2Te_2$ or $Ag_2Ti_2Te_2$.

ADVANTAGES

As defined above, the optical recording medium according to one form of the present invention includes a substrate, a reflective thin film on one major surface of the substrate, an intermediate thin film thereon, and a low-melting thin film thereon. The low-melting thin film is formed on the reflective this film through the intermediate thin film by gas phase growth processes such as sputtering as will be described later in detail. An element (B) constituting the intermediate thin film is effective for preventing diffusion of an element (C) constituting the low-melting thin film, the behavior of element (B) being referred to as locking action. Then during formation of the low-melting thin film, no or little interdiffusion occurs between the reflective and low-melting thin films. Then even when the reflective thin film is as thin as about 500 Å, it can be avoided that the reflective thin film assumes a recorded state during preparation.

Part of recording laser light directed to the medium from the rear surface side transmits the reflective thin film and reaches the intermediate thin film whereby it is heated. Then the intermediate thin film is activated to cancel the locking action of element (B), allowing the element (C) of the low-melting thin film and the element (A) of the reflective thin film to diffuse with each other to form an alloy or compound of these elements. As a result, the optical reflectivity of the areas exposed to recording laser light is substantially reduced. At this time, the element (B) of the intermediate thin film mostly diffuses toward the low-melting thin film.

The resulting optical recording medium is of the write-once type since the change in optical reflectivity is irreversible. The reflectivity to laser light having a wavelength of 780 nm commonly used with the CD standard is about 5% or higher before exposure and is substantially reduced to about 17% or lower after exposure to recording laser light. This ensures utility as an optical recording disk of the write-once type satisfying the CD standard.

The intermediate thin film is so endothermic that it may be fully heated with light transmitted by the reflective thin film even when the reflective thin film is of a high reflectivity element such as Ag. Therefore, high recording sensitivity is achieved while maintaining high reflectivity in unrecorded areas.

The optical recording medium of the invention provides high initial reflectivity and reflectivity change not only at a wavelength of 780 nm, but also over a wide wavelength range of from about 400 nm to about 900 nm. This suggests the possible use of laser light of shorter wavelength and possible recording and reproduction at higher density therewith.

The invention is not limited to a recording layer of the three layer structure mentioned above. Also contemplated herein is an embodiment using a recording layer of a single layer structure, that is, a recording layer containing all elements (A), (B) and (C). In this embodiment, an amorphous recording layer is formed by sputtering since element (B) restrains bonding between elements (A) and (C) during the process. Upon exposure to recording laser light, an exposed spot is melted and cooled and thus crystallizes to change its reflectivity. It is to be noted that reflectivity increases by recording.

Also in this embodiment, the recording layer which is amorphous as deposited can be initialized by continuously heating it for crystallization. Subsequent exposure to recording laser light causes the recording layer to become amorphous even at a low linear velocity as experienced in CDs because element (B) exerts the locking action to reduce the crystallization rate. In this case, reflectivity decreases by recording and repetitive recording/reproducing operation is possible.

We have found that the locking action and diffusion occurrence among the reflective thin film, intermediate thin film, and low-melting thin film as well as the locking phenomenon in the recording layer of single layer structure can be predicted by the simulation performed by applying the frontier orbital theory heretofore known in the field of organic chemistry to the metal and metal alloy field. If the possibility of locking and unlocking can be predicted by simulation, the time, labor and expense spent for the design of a new optical recording medium can be substantially reduced.

DETAILED DESCRIPTION OF THE INVENTION

Three layer embodiment

Figure 1:
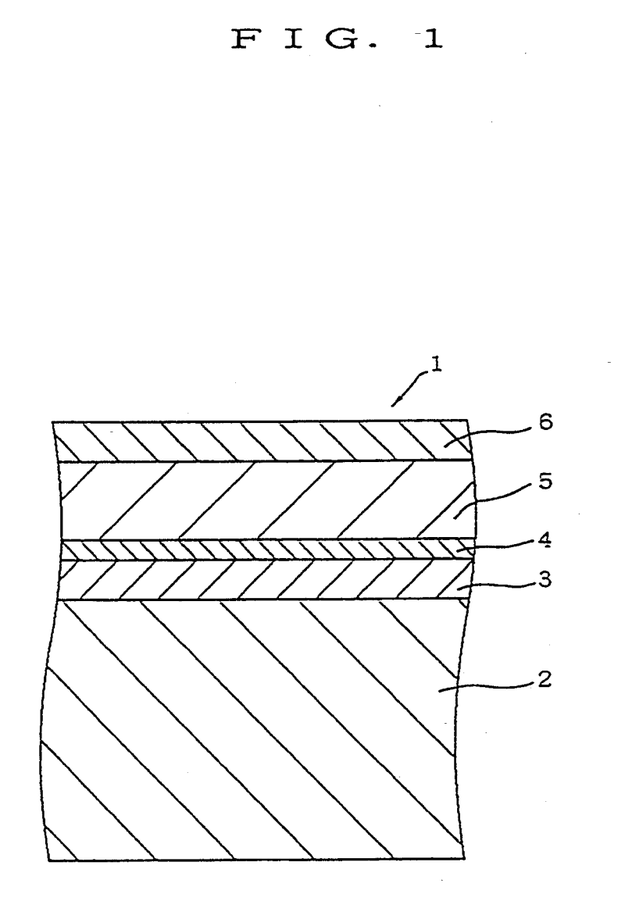
FIG. 1 is a fragmentary cross-sectional view of an optical recording medium according to one preferred embodiment of the invention.

Referring to FIG. 1, there is illustrated an optical recording medium 1 according to one preferred embodiment of the present invention as comprising a substrate 2 having a pair of major surfaces, a recording layer on one major surface of the substrate, and a protective film 6 thereon. The recording layer consists of a reflective thin film 3 on the substrate, an intermediate thin film 4 thereon, and a low-melting thin film 5 thereon. The protective film 6 is thus on the low-melting thin film 5.

Substrate

The optical recording medium 1 is recorded and reproduced by directing recording light and reproducing light to the reflective thin film 3 through the substrate 2. Thus the substrate 2 should be substantially transparent to light. Such substrates are often formed of various glasses and various resins such as acrylic resins, polycarbonate resins, epoxy resins, and polyolefin resins. The shape and dimensions of the substrate are not critical although it is most often of disk shape and has a thickness of about 0.5 to about 3 mm and a diameter of about 50 to about 360 mm. If desired or necessary, one major surface of the substrate 2 on which the reflective thin film 3 is to be deposited is provided with a predetermined pattern including pits and/or grooves for tracking and addressing purposes.

Reflective thin film

Deposited on one surface of the substrate 2 is the reflective thin film 3 which contains at least one element (A) selected from the group consisting of silver Ag, gold Au, copper Cu, and platinum Pt as a major component. These elements are selected for the reflective thin film 3 because they can provide high reflectivity over a wide wavelength range and undergo a substantial change in reflectivity as a result of subsequent reaction with the low-melting thin film 5. Silver, gold, copper or platinum alone is preferred, with silver being most preferred.

It is acceptable that Sb, Sn, In, S and analogous elements be added to the reflective thin film 3. Sb is effective for increasing the rate of interdiffusion between the reflective and low-melting thin films 3 and 5, with the benefits of possible recording with lower power and increased recording sensitivity. Sn and In are effective for lowering the melting point of the reflective thin film 3, also resulting in increased recording sensitivity. These additional elements are preferably added in a total amount of up to 5 atom % in the reflective thin film 3. Excess contents of such an additional element or elements would cause a lowering of reflectivity.

Gas phase growth processes such as sputtering and evaporation are preferred in forming the reflective thin film 3.

Intermediate thin film

Deposited on the reflective thin film 3 is the intermediate thin film 4 which contains at least one element (B) selected from the group consisting of titanium Ti, zirconium Zr, hafnium Hf, vanadium V, niobium Nb, tantalum Ta, manganese Mn, tungsten W, and molybdenum Mo as a major component. These elements are selected for the intermediate thin film 4 because they are effective for preventing interdiffusion between the reflective and low-melting thin films 3 and 5 at room temperature and can be readily activated, by heating upon exposure to recording laser light, to such a state allowing interdiffusion between the reflective and low-melting thin films 3 and 5. Among these elements, vanadium and titanium, especially vanadium are most preferred.

Like the reflective thin film 3, the intermediate thin film 4 is preferably formed by gas phase growth processes.

Low-melting thin film

Deposited on the intermediate thin film 4 is the low-melting thin film 5 which contains at least one element (C) selected from the group consisting of tellurium Te, selenium Se, and sulfur S as a major component. The low-melting thin film 5 should preferably have a melting point of about 200° to about 400° C. Like the reflective thin film 3, the low-melting thin film 5 is preferably formed by gas phase growth processes.

It is acceptable that Sn and analogous elements be added to the low-melting thin film 5. These additional elements are preferably added in a total amount of up to 5 atom % in the low-melting thin film 5.

Thin film thickness

The thickness of the respective thin films may be suitably determined in accordance with the desired property for the respective thin films.

In one preferred embodiment, the intermediate thin film 4 has a thickness of about 10 to 200 Å, especially about 30 to 120 Å. The intermediate thin film 4 having a thickness below the range would be less effective for preventing interdiffusion between the reflective and low-melting thin films 3 and 5 during formation of the low-melting thin film 5. With a thickness beyond the range, a longer time would be taken for a low-melting thin film-constituting element, typically Te, to diffuse, resulting in a noticeable lowering of recording sensitivity.

To obtain high modulation, that is, contrast in reflectivity, the ratio in thickness of the low-melting thin film 5 to the reflective thin film 3 ranges from about 1/1 to about 5/1, especially from about 1/1 to about 3/1. The modulation used herein is defined as $(Ro-R)/Ro \times 100\%$ wherein Ro is the optical reflectivity of an unrecorded area and R is the optical reflectivity of a recorded area, that is, an area exposed to recording laser light. In the embodiment wherein reflectivity decreases by recording, the modulation is defined as $(R-Ro)/R \times 100\%$.

In one preferred embodiment, the reflective thin film 3 is about 200 to about 700 Å thick, especially about 220 to about 550 Å thick. Initial reflectivity would be low below the range. With a thickness beyond the range, a longer time would be taken for a low-melting thin film-constituting element (exactly stated, atoms) to diffuse, resulting in a noticeable lowering of recording sensitivity.

Similarly, the low-melting thin film 5 is about 200 to about 1,500 Å thick, especially about 250 to about 550 Å thick. Below the range, reaction between a reflective thin film-constituting element and a low-melting thin film-constituting element would take place to a less extent so that a substantial portion of the reflective thin film is left unreacted, failing to provide a substantial change of reflectivity. Beyond the range, a large amount of the low-melting thin film is left unreacted, also failing to provide a substantial change of reflectivity.

By selecting the thickness of the respective thin films within the above-defined ranges and relationship, a very high modulation of at least 60% is obtained.

Protective film

The protective film 6 is provided for improving scratch resistance and corrosion resistance. It is usually formed of various organic materials, preferably radiation-curable compounds and compositions thereof which are cured with radiation such as electron radiation and UV light. The protective film may be formed to a thickness of about 0.1 to about 100 $\mu$m by conventional processes such as spin coating, gravure coating, spraying and dipping.

Inorganic materials may also be used to form the protective film. An organic film overlying an inorganic film is also useful as a protective film. The inorganic protective film may be formed of dielectric materials such as oxides, carbides, nitrides, and sulfides and mixtures thereof, by conventional gas phase deposition methods such as sputtering, evaporation and ion plating. It may have a thickness of about 10 to 150 $\mu$m.

Reflectivity change

Now the reflectivity change in the optical recording medium of the above-mentioned construction is described.

Recording laser light is directed to the reflective thin film 3 from the substrate rear (lower) side in FIG. 1. Part of laser light transmits the reflective thin film 3 and reaches the intermediate thin film 4 which is thus heated by the transmitted light. The intermediate thin film 4 which has prevented interdiffusion between the reflective and low-melting thin films 3 and 5 at room temperature loses its locking action when heated. At this point, the interdiffusion occurs between the reflective thin film-constituting element and the low-melting thin film-constituting element (exactly stated, atoms), forming a compound or alloy of these elements which has a substantially reduced optical reflectivity.

In forming the low-melting thin film 5 by any gas phase growth process, the reflective thin film 3 does not undergo interdiffusion with the low-melting thin film 5 because the intermediate thin film 4 exerts locking action, that is, restrains interdiffusion. This locking action is not cancelled by heat associated with sputtering. Therefore, areas where recording laser light is not irradiated, that is, unrecorded areas maintain high optical reflectivity.

Simulation

The locking action and diffusion occurrence among the reflective thin film 5, intermediate thin film 4, and low-melting thin film 3 mentioned above can be predicted by performing simulation utilizing the frontier orbital theory heretofore known in the field of quantum chemistry. Although this theory has normally been applied to organic chemistry, we have discovered that the theory can be applied to problems related to interdiffusion within a structure of thin films containing different atoms by considering a cluster of such atoms. An exemplary cluster contains two or more atoms for each of the elements constituting the respective thin films. For an exemplary arrangement including a reflective thin film 3 of Ag, an intermediate thin film 4 of V or Ti, and a low-melting thin film 5 of Te, the cluster is regarded as consisting of $Ag_2V_2Te_2$ or $Ag_2Ti_2Te_2$.

The cluster has a plurality of electron orbitals among which important are an electron-free orbital having lowest energy designated lowest unoccupied molecular orbital (LUMO) and an electron-carrying orbital having highest energy designated highest occupied molecular orbital (HOMO).

Figure 2:
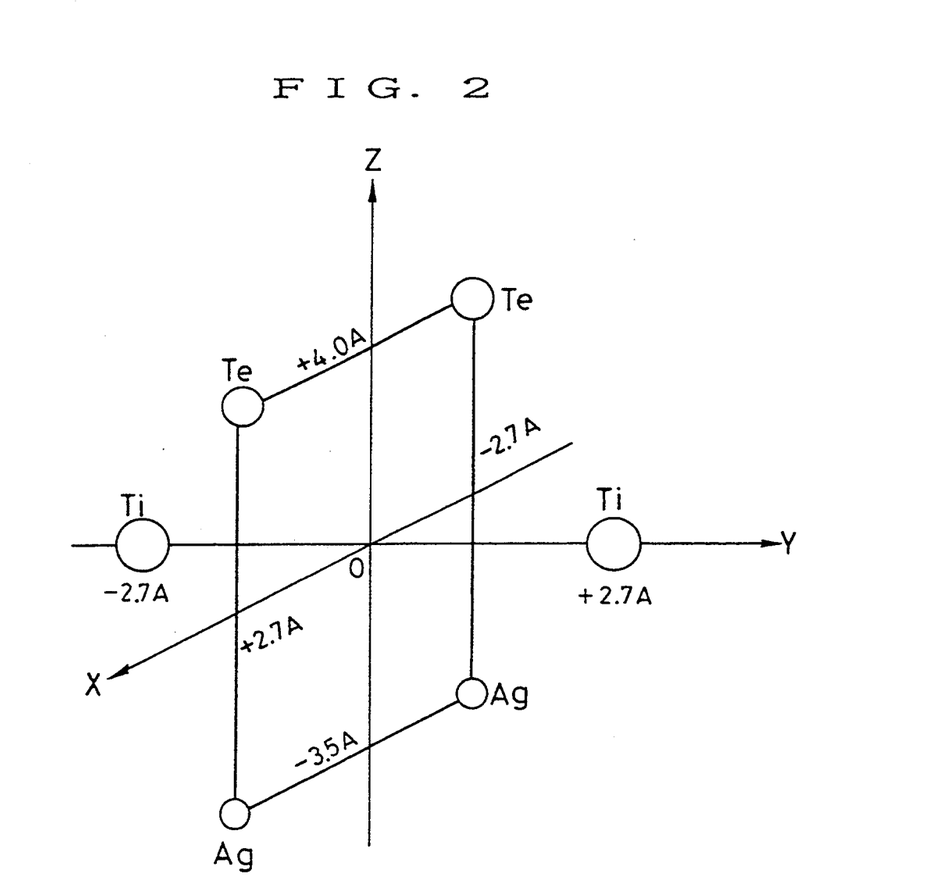
FIG. 2 schematically illustrates the atom arrangement of a cluster $Ag_2Ti_2Te_2$.
Figure 3:
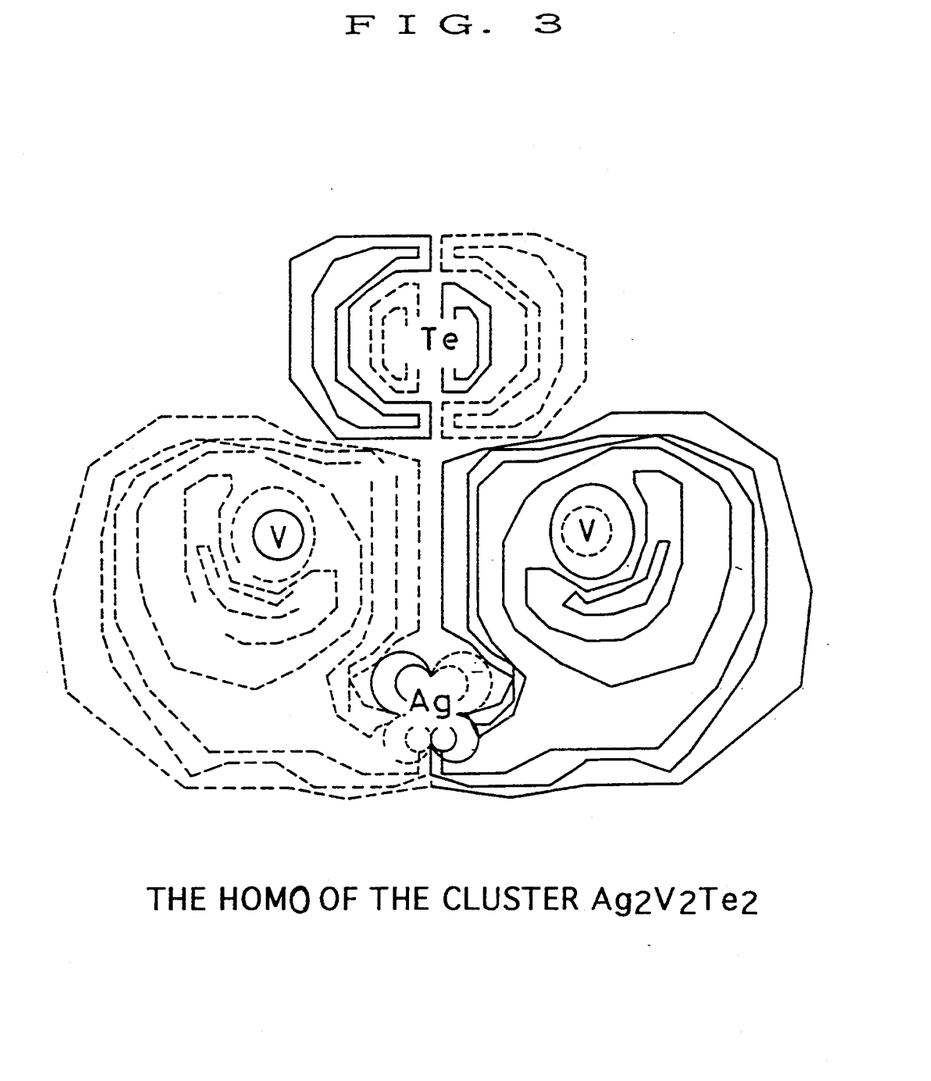
FIG. 3 is a spatial illustration of a wave function representing the electron density distribution in the HOMO of the cluster $Ag_2V_2Te_2$.
Figure 4:
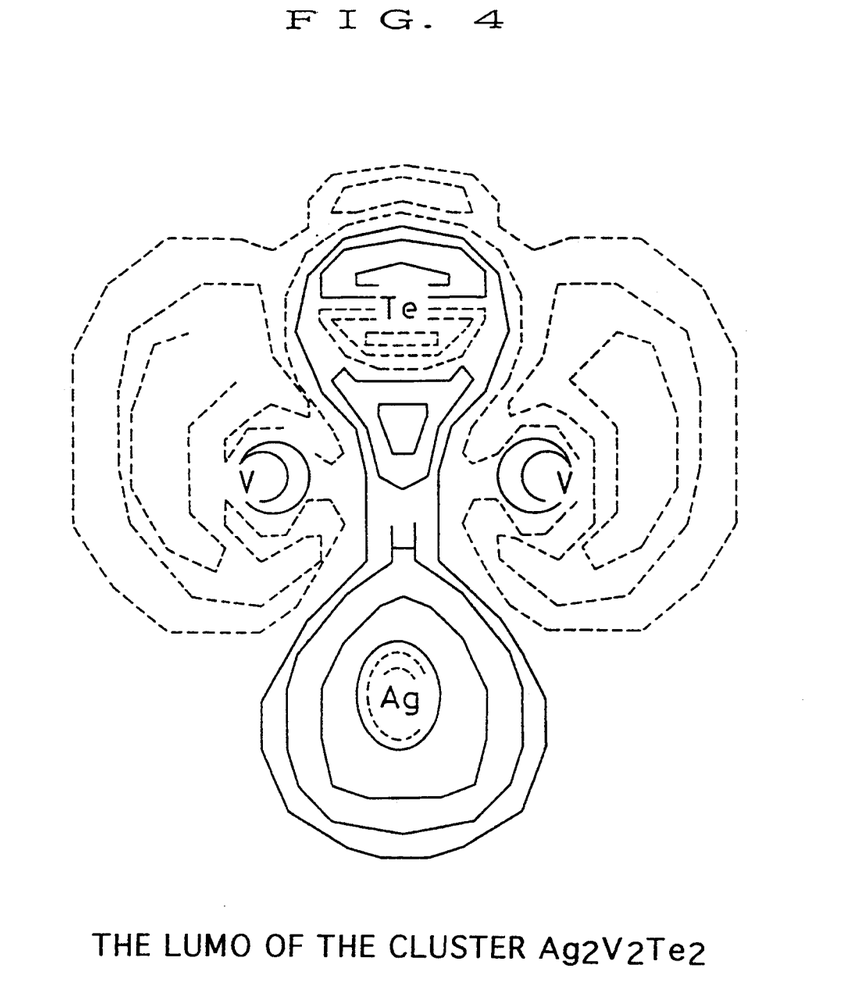
FIG. 4 is a spatial illustration of a wave function representing the electron density distribution in the LUMO of the cluster $Ag_2V_2Te_2$.
Figure 5:
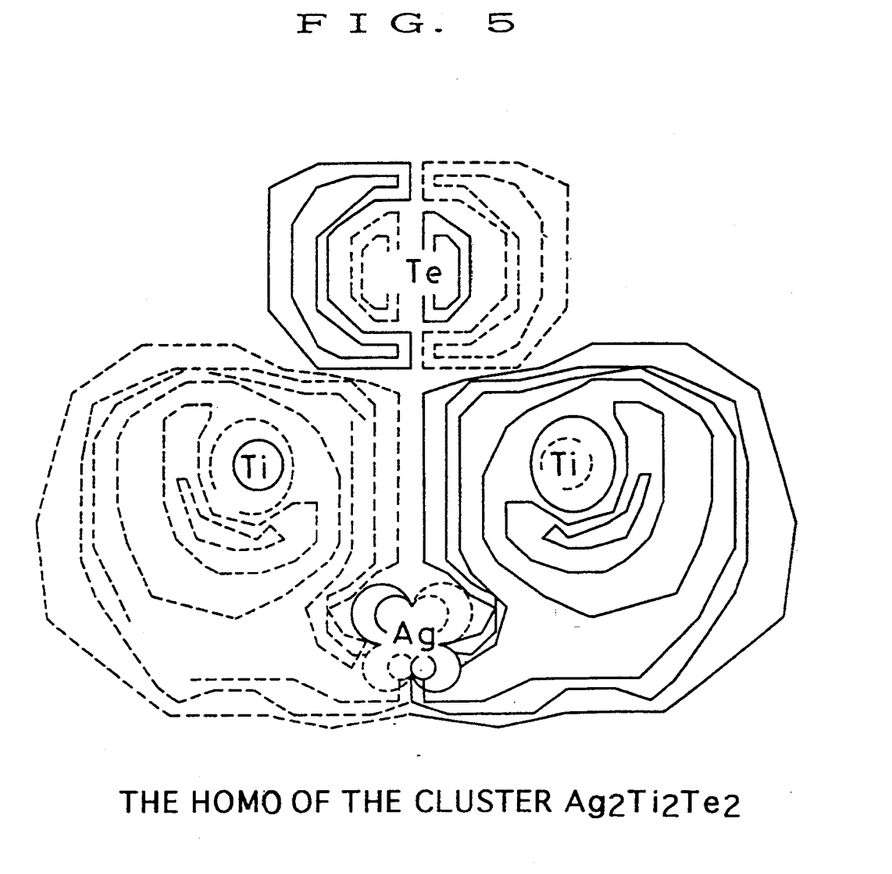
FIG. 5 is a spatial illustration of a wave function representing the electron density distribution in the HOMO of the cluster $Ag_2Ti_2Te_2$.
Figure 6:
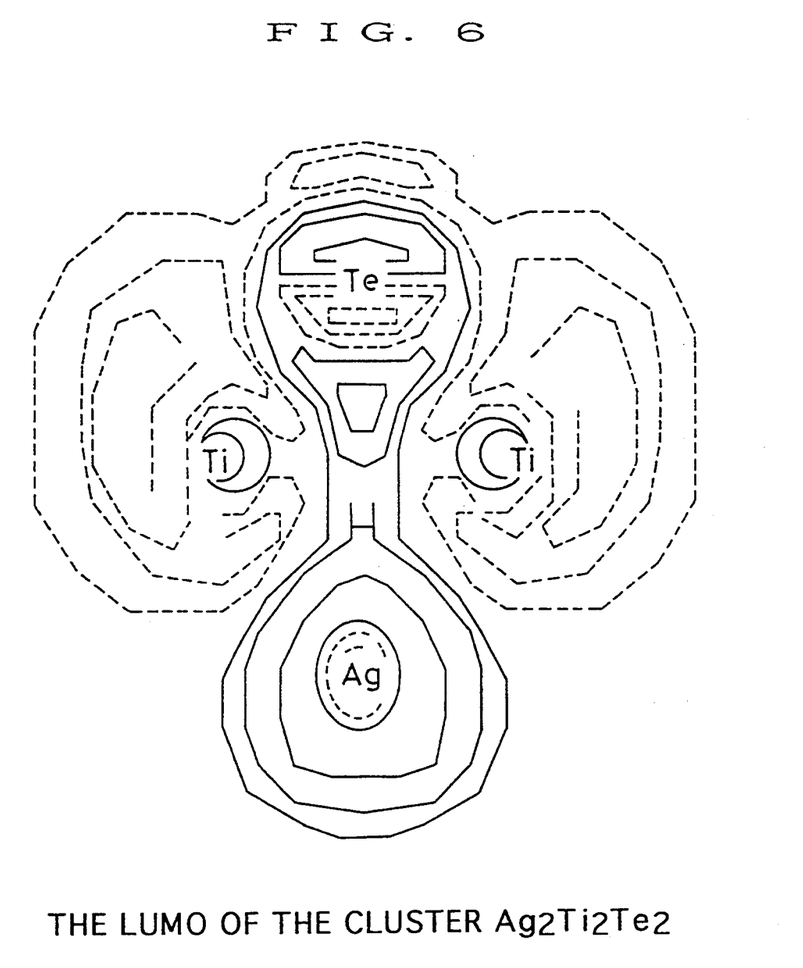
FIG. 6 is a spatial illustration of a wave function representing the electron density distribution in the LUMO of the cluster $Ag_2Ti_2Te_2$.

The cluster is illustrated by referring to FIGS. 2 to 6. FIG. 2 schematically illustrates an atom arrangement in the cluster $Ag_2Ti_2Te_2$. FIGS. 3 and 5 are spatial illustrations of a wave function representing the electron density distribution in the HOMO of the clusters $Ag_2V_2Te_2$ and $Ag_2Ti_2Te_2$, respectively. FIGS. 4 and 6 are spatial illustrations of a wave function representing the electron density distribution in the LUMO of the clusters $Ag_2V_2Te_2$ and $Ag_2Ti_2Te_2$, respectively. In FIGS. 3 to 6, the upper atom is Te, the lower atom is Ag, and the left and right atoms are V or Ti. It will be understood that FIGS. 3 to 6 are plan views of the cluster of FIG. 2 when viewed in x-axis direction. The Te and Ag atoms existing beyond the y-z plane are not depicted.

The electron density distributions in the HOMO and LUMO can be determined by the molecular orbital method known as Sw-X$\alpha$ method. With respect to the detail of Sw-X$\alpha$ method, reference is made to K. H. Johnson, D. D. Vvedensky and R. P. Messmer, Phys. Rev., B19, 1519 (1979).

In FIGS. 3 to 6, electrons associated with constant electron density contour lines depicted by solid lines and electrons associated with constant electron density contour lines depicted by broken lines are different in the sign of spin. There occurs attractive force between electrons with the same sign of spin and repulsive force between electrons with different signs of spin.

It is seen from the HOMO electron density distributions shown in FIGS. 3 and 5 that two V or Ti atoms and an Ag atom are firmly bonded because constant electron density contour lines circumscribing each V or Ti atom are connected to constant electron density contour lines circumscribing the Ag atom so that electrons in these atoms form a hybrid orbital. It is also seen that the V or Ti atoms tend to expel out the Te atom. That is, in the HOMO of cluster $Ag_2V_2Te_2$ or $Ag_2Ti_2Te_2$, the V or Ti atoms lock the bond between the Ag and Te atoms.

Also, it is seen from the LUMO electron density distributions shown in FIGS. 4 and 6 that electrons in a Te atom form a hybrid orbital with electrons in an Ag atom so that the Te and Ag atoms are firmly bonded. That is, if electrons in the HOMO of the cluster $Ag_2V_2Te_2$ or $Ag_2Ti_2Te_2$ are excited and jump up to the LUMO, the locking action of V or Ti atoms is cancelled, allowing Ag atoms and Te atoms to interdiffuse to form a bond.

Provided that a cluster consists of three types of atoms in which repulsive force develops in HOMO and attractive force develops in LUMO, by forming first and second thin films from two types of atoms, and interposing therebetween a third thin film of the remaining one type of atom which exerts locking action in HOMO, there is obtained a recording layer or stack in which the locking phenomenon and the occurrence of diffusion due to energy transfer can be predicted as exemplified by a recording layer in the form of a stack of an Ag film, a V or Ti film, and a Te film.

Further, energy necessary to cancel the locking action of the third thin film can be predicted from the energy difference between LUMO and HOMO of the cluster. More particularly, for the third thin film having a thickness of about 10 to 200 Å, if the energy difference between LUMO and HOMO of the cluster is from about 0.002 to 3 eV, then the locking action can be cancelled by a commonly used laser power of typically up to 15 mW, especially about 10 to 15 mW at a linear velocity of 1.2 to 1.4 m/s according to the CD standard. This was confirmed by empirical results. In exemplary clusters of $Ag_2V_2Te_2$ and $Ag_2Ti_2Te_2$, the energy difference between LUMO and HOMO was 1.7 eV and 1.5 eV, respectively.

The energy for exciting electrons from HOMO to LUMO may be provided in either light or heat form. Excitation by laser light irradiation is due to light energy or light energy combined with thermal energy.

Single layer embodiment

In another preferred embodiment, the recording layer is a single layer containing all elements (A), (B) and (C) defined above. The same advantages as above are obtained.

Figure 7:
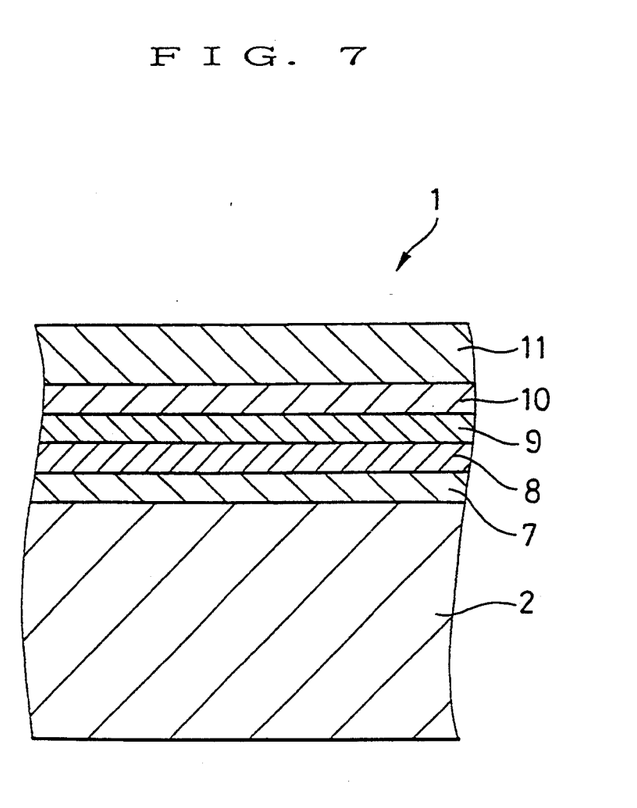
FIG. 7 is a fragmentary cross-sectional view of an optical recording medium according to another preferred embodiment of the invention.

The single layer embodiment cannot provide a reflectivity beyond 70%, but can offer a modulation of 60% or more by taking advantage of interference effect when a bower dielectric layer 7, a recording layer 8, an upper dielectric layer 9 and a reflective layer 10 are layered on a substrate 2 as shown in FIG. 7 in the described order.

The lower and upper dielectric layers may be formed of inorganic materials as previously described for the inorganic protective film. The reflective layer may be formed of relatively high reflectivity materials such as Au, Ag, Pt, Al, Ti, Cr, Ni, and Co or an alloy or compound thereof. The dielectric and reflective layers may be formed by gas phase growth methods such as sputtering. An organic protective film 11 as previously mentioned is preferably formed on the reflective layer 10.

In the single layer embodiment, the recording layer preferably contains elements (A) and (C) in a ratio of about 1:1 to about 3:1 and elements (A) and (B) in a ratio of about 1:0.01 to about 1:0.5. This (A):(B) range is sufficient to prohibit crystal growth between elements (A) and (C), that is, retards the crystallization rate by 10 to 50% as compared with a similar layer free of element (B).

Preferably the recording layer is about 100 to 1,000 Å thick. Below the range, a sufficient phase change would not occur. Beyond the range, the layer has a too high optical absorptivity to expect expanded modulation by interference. The thickness of the remaining layers may be suitably chosen so as to maximize modulation. Most often, the lower dielectric layer is about 1,500 to 2,500 Å, the upper dielectric layer is about 100 to 300 Å, and the reflective layer is about 500 to 1,000 Å thick.

Application

Although the present invention has been described as being applied to optical recording media of the single side recording type, the invention is also applicable to optical recording media of the double side recording type. Optical recording media of the double side recording type are obtained by mating a pair of substrates such that the recording layers thereon face each other. Also contemplated are optical recording media of the single side recording type having a protective plate bonded to the protective film 6 (FIG. 1). The protective plate may be of the same material as the substrate although other materials are acceptable since it need not be transparent.

EXAMPLE

Examples of the present invention are given below by way of illustration and not by way of limitation.

Example 1

An optical recording disk, designated sample No. 1, of a structure as shown in FIG. 1 was prepared by sequentially forming a reflective thin film 3, an intermediate thin film 4, a low-melting thin film 5, and a protective film 6 on one major surface of a substrate 2.

The substrate 2 was a disk injection molded from polycarbonate resin to a diameter of 133 mm and a thickness of 1.2 mm having spiral grooves formed thereon during injection molding. The reflective thin film 3 was of silver sputtered to a thickness of 250 Å. The intermediate thin film 4 was of titanium sputtered to a thickness of 50 Å. The low-melting thin film 5 was of tellurium sputtered to a thickness of 500 Å. The protective film 6 was of a UV-curable resin which was applied by spin coating and cured with UV light to a thickness of 5 μm.

Sample No. 1 was examined for recording/reproducing performance. A laser beam was irradiated at 12 mW for recording and at 1 mW for reproducing. The laser light had a wavelength of 780 mn.

Unrecorded areas had a reflectivity of 75% and recorded areas had a reflectivity of 13%, indicating a sufficient reflectivity and its change.

The results of simulation on the cluster $Ag_2Ti_2Te_2$ associated with Ag, Ti, and Te thin films are as previously described in the disclosure.

Example 2

An optical recording disk, designated sample No. 2, was prepared by the same procedure as in Example 1 except that the reflective thin film was a silver film of 500 Å thick and the intermediate thin film was a vanadium film of 100 Å thick.

Sample No. 2 was examined for recording/reproducing performance by the same procedure as in Example 1. Unrecorded areas had a reflectivity of 77% and recorded areas had a reflectivity of 17%, indicating a sufficient reflectivity and its change.

Example 3

Optical recording disk samples were prepared by the same procedure as in Example 1 except that the reflective thin film was formed of Au, Cu or Pt.

Optical recording disk samples were prepared by the same procedure as in Example 1 except that the intermediate thin film was formed of Zr, Hf, Nb, Ta, Mn, W or Mo.

Optical recording disk samples were prepared by the same procedure as in Example 1 except that the low-melting thin film was formed of Se or S.

These samples were examined for recording/reproducing performance by the same procedure as in Example 1, obtaining substantially equivalent results.

Example 4

An optical recording disk sample of the configuration shown in FIG. 7 was prepared by forming a lower dielectric layer 7, a single recording layer 8, an upper dielectric layer 9, a reflective layer 10, and a protective film 11 on one major surface of a substrate 2. The substrate and protective film were the same as in Example 1, the dielectric layers were of ZnS—SiO$_2$, and the reflective layer was of gold. The recording layer had a composition: Ag$_{11.0}$Te$_{29.0}$V$_{0.04}$ (atomic ratio) and was formed by sputtering to a thickness of 200 Å. The target used was a tellurium target having silver and vanadium chips attached thereto.

This sample was examined for recording/reproducing performance by the same procedure as in Example 1 to find that unrecorded areas in an amorphous state had a reflectivity of 13% and recorded areas in a crystalline state had a reflectivity of 44%, that is, a modulation of 70%. In another run, the recording layer as deposited was heated for crystallization and signals were recorded in the thus initialized recording layer, obtaining an equivalent reflectivity and modulation. This enabled repetitive recording/reproducing operation.

There has been described an optical recording medium having a sufficient modulation to provide for reproduced signals of increased magnitude, minimizing errors even when the drive apparatus is low in precision and reliability. Since high reflectivity and a great reflectivity change are available even in a shorter wavelength range in proximity to 400 nm, a shorter wavelength laser can be used, resulting in increased storage capacity. The optical recording medium has high recording sensitivity and allows for recording with lower power laser light, for example, with laser light at a reduced power of 14 mW or lower, in some cases, of 8 mW or lower.

While we have shown and described particular embodiments of our invention, it will be obvious to those skilled in the art that various changes and modifications may be made without departing from the invention in its broader aspects.

We claim:

1. An optical recording medium comprising a recording layer on a surface of a substrate, said recording layer predominantly containing at least one element (A) selected from the group consisting of Ag, Au, Cu and Pt, at least one element (B) selected from the group consisting of Ti, Zr, Hf, V, Nb, Ta, Mn, W and Mo, and at least one element (C) selected from the group consisting of Te, Se and S.

2. The medium of claim 1 wherein said recording layer is of a single layer structure, and said medium includes a lower dielectric layer, the recording layer, an upper dielectric layer, and a reflective layer on the substrate in the described order.

3. The medium of claim 1 wherein said recording layer includes a reflective thin film, an intermediate thin film and a low-melting thin film on the substrate in the described order, said reflective thin film predominantly containing element (A) and having a thickness of 200 to 700 Å, said intermediate thin film predominantly containing element (B) and having a thickness of 10 to 200 Å, and said low-melting thin film predominantly containing element (C) and having a thickness of 200 to 1500 Å.

4. The medium of claim 3 wherein said intermediate thin film has a thickness of 10 to 200 Å.

5. The medium of claim 3 wherein the ratio of the thickness of said low-melting thin film to the thickness of said reflective thin film is from 1 to 5.

6. The medium of claim 3 wherein said reflective thin film has a thickness of 200 to 700 Å and said low-melting thin film has a thickness of 200 to 1,500 Å.

7. The medium of claim 1 wherein elements (A), (B) and (C) form a cluster of atoms which has a highest occupied molecular orbital where electrons in element (A) and electrons in element (C) do not form a hybrid orbital and a lowest unoccupied molecular orbital where electrons in element (A) and electrons in element (C) form a hybrid orbital.

8. The optical recording medium of claim 7 wherein said cluster has an energy difference of about 0.002 to 3 eV between the highest occupied molecular orbital and the lowest unoccupied molecular orbital.

9. The medium of claim 7 wherein said cluster is Ag$_2$V$_2$Te$_2$ or Ag$_2$Ti$_2$Te$_2$.

* * * * *

UNITED STATES PATENT AND TRADEMARK OFFICE
CERTIFICATE OF CORRECTION

PATENT NO. : 5,389,417

DATED : February 14, 1995

INVENTOR(S) : Tominaga, et al

It is certified that error appears in the above-identified patent and that said Letters Patent is hereby corrected as shown below:

On the title page, item [73], Assignee: "ADK Corporation, Tokyo Japan" should read -- TDK Corporation, Tokyo Japan--.

Signed and Sealed this

Thirty-first Day of October 1995

*Attest:*

BRUCE LEHMAN

*Attesting Officer*  *Commissioner of Patents and Trademarks*